No. 649,017. Patented May 8, 1900.
P. TIEDEMANN.
POTATO DIGGER.
(Application filed Feb. 9, 1900.)

(No Model.) 2 Sheets—Sheet 1.

Witnesses  Inventor
Paul Tiedemann
by Wm. H. Monroe
Attorney

THE NORRIS PETERS CO., PHOTO-LITHO., WASHINGTON, D. C.

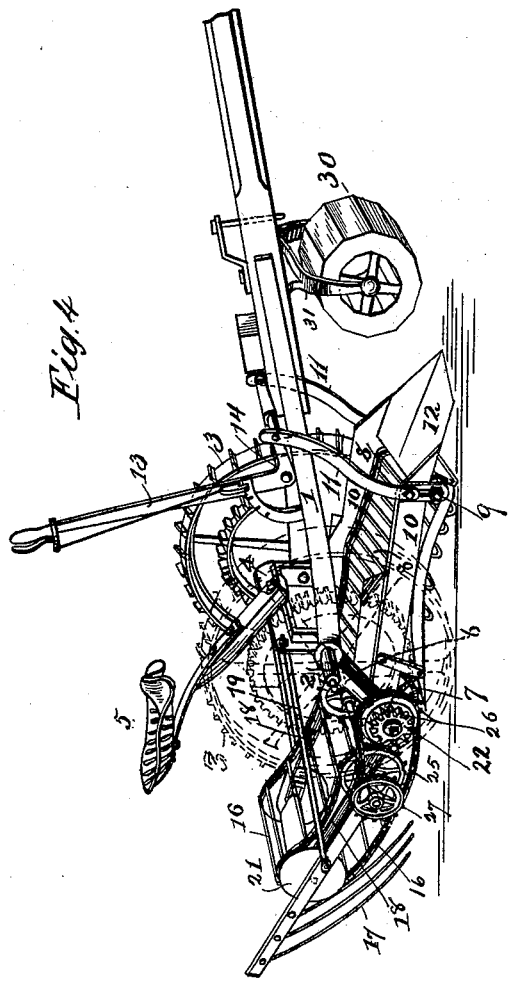

UNITED STATES PATENT OFFICE.

PAUL TIEDEMANN, OF NORTH LINNDALE, OHIO.

POTATO-DIGGER.

SPECIFICATION forming part of Letters Patent No. 649,017, dated May 8, 1900.

Application filed February 9, 1900. Serial No. 4,615. (No model.)

*To all whom it may concern:*

Be it known that I, PAUL TIEDEMANN, a citizen of the United States, and a resident of North Linndale, county of Cuyahoga, State of Ohio, have invented certain new and useful Improvements in Potato-Diggers, of which I hereby declare the following to be a full, clear, and exact description, such as will enable others skilled in the art to which it appertains to make and use the same.

My invention relates to improvements in potato-diggers; and the object of the invention is to provide mechanism which will separate the potatoes from the dirt and refuse inclosing them and lay them on the top of the ground, where they will be clean and accessible to the one gathering them. To accomplish these results, I employ the device described in the following specification, shown in the accompanying drawings, and specifically pointed out in the claims.

Figure 1:
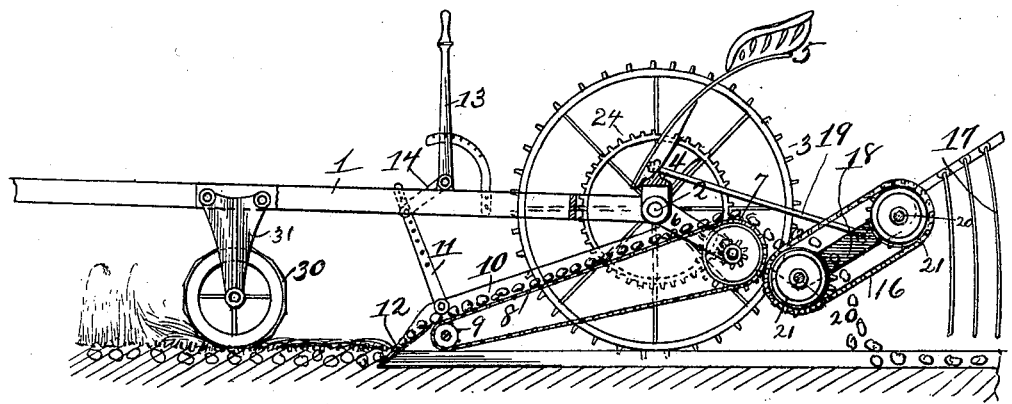
Figure 3:
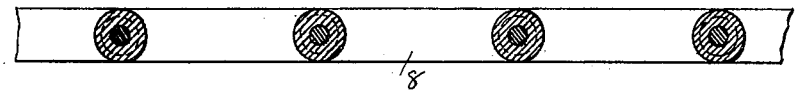
Figure 2:
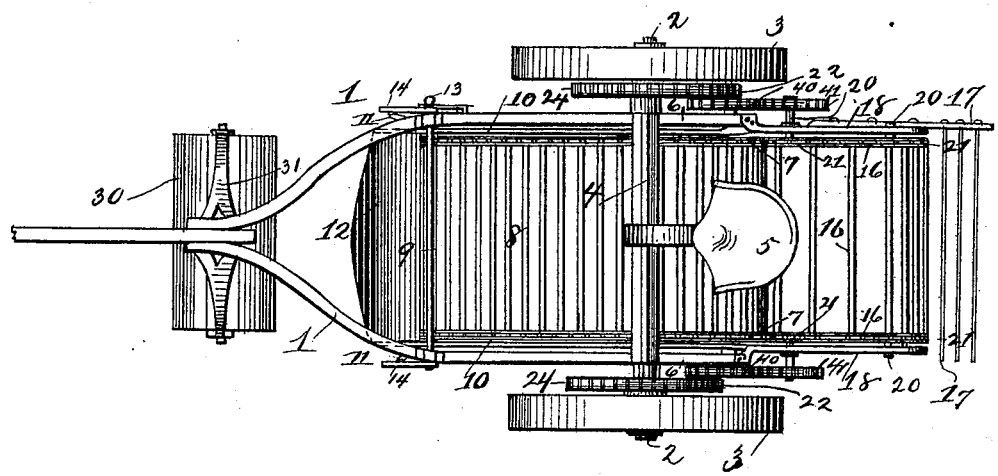

In the accompanying drawings, Figure 1 is a longitudinal sectional view of the device. Fig. 2 is a plan view thereof. Fig. 3 is a section of chain for apron. Fig. 4 is a perspective view.

In the views, 1 is the frame, which is provided with axle-wrists 2, one on each side, for the main wheels 3, and a transverse bar 4, which carries the seat 5. The frame is further provided with downwardly-turned arms 6, one on each side, at the extremities of which are found bearings for the sprocket-wheels 7, upon which is mounted one extremity of the sifting-apron 8. The other extremity of this apron is mounted upon smaller sprocket-wheels 9, secured in turn upon the side bars 10 at their forward extremities. These side bars pivot at the rear upon the shaft of the sprocket-wheels 7 and are connected together in front by means of the scoop-shovel 12. The bars and shovel are lowered in front to engage the earth by means of the links 11 and lever and arms 13 and 14. The side bars 10 rise one on each side of the sifter, so as to retain the load of dirt and potatoes which is carried up thereon, the dirt sifting through and the heavy weeds or grass being carried up with such potatoes as are too large to fall through the sieve-openings. After passing up the inclined sieve the dirt and potatoes remaining fall upon the second sieve 16, which is also inclined upward and is provided with cross-bars spaced farther apart, so as to leave openings two or three times the size of those in the first inclined sieve. Through these openings the remaining dirt will fall; but the grass and weeds will be carried up to the extremity and then be turned aside by means of the inclined fork 17, so as not to cover the line of potatoes.

The supports for the second apron are seen to be arms 18, secured at the extremities of the downwardly-turned arms 6 at the frame extremities, and further secured by rods 19, attached to the transverse bar 4. Upon the arms 18 are mounted shafts 20, which bear the sprocket-wheels 21, carrying the apron.

In Figs. 1 and 2 spur-gears are shown driving the sprocket-wheel shaft at 40 and 41, the gear 22 being directly driven by the large spur-gears 24 upon the wheel-hubs. In Fig. 4, however, a sprocket-chain 25 engages the wheels 26 and 27 and takes the place of the gearing.

The heavy roller 30 is pivoted in the fork 31, attached to the front of the main frame or to the pole. This roller is quite important to the best working of the machine, since it presses and mats down the weeds, thus putting them in good condition to be taken in a body up by the shovel and carried by the bars of the aprons until thrown aside by the inclined fork.

Having described my invention, what I claim as new, and desire to secure by Letters Patent, is—

1. In a potato-digger, the combination with a frame provided with axle-wrists one upon each side, rearwardly-depending arms, and an elevated transverse bar, upon which the seat is supported, of a shaft for sprocket-wheels supported in the depending extremities of the frame, side bars supported at their rear extremities upon said shaft, and connected in front by an inclined shovel, an endless sifting-apron provided with cross-bars at regular intervals, and adapted to move between said side bars — sprocket-wheels mounted upon front and rear shafts adapted to operate and support said apron, spur-gears upon the main wheel, hubs and rear sprocket-shaft, an auxiliary sifting-apron provided with cross-bars spaced at a greater distance apart than the first-named apron, and an inclined fork for turning aside materials carried up the second apron, substantially as described.

2. In a potato-digger, the combination with a main frame, provided with a transverse bar upon which the seat is supported and with axle-wrists one on each side, of side bars pivotally supported in the rear beneath the frame, and connected in front by means of an inclined shovel, an endless sifting-apron mounted between said side bars upon sprocket-wheels, an auxiliary sifting-apron adapted to receive refuse too large to pass through the first-named apron, a diagonally-placed fork adapted to turn said refuse away from the path of the machine, and a roller secured to the front of the machine and adapted to press down and mat grass or weeds in advance of the shovel, substantially as described.

Signed by me at Cleveland, Ohio, this 20th day of December, A. D. 1899.

PAUL TIEDEMANN.

Witnesses:
WM. M. MONROE,
JESSE A. FENNER.